United States Patent
Akahori (10) Patent No.: US 11,745,651 B2
(45) Date of Patent: Sep. 5, 2023

(54) SOUND OUTPUT DEVICE, COMMUNICATION CONTROLLER, AND SOUND GENERATOR THAT PROVIDES APPROACHING NOTIFICATION SOUND WHILE REDUCING MCU LOAD

(71) Applicant: LAPIS SEMICONDUCTOR CO., LTD., Yokohama (JP)

(72) Inventor: Hiroji Akahori, Yokohama (JP)

(73) Assignee: LAPIS SEMICONDUCTOR CO., LTD., Yokohama (JP)

(*) Notice: Subject to any disclaimer, the term of this patent is extended or adjusted under 35 U.S.C. 154(b) by 0 days.

(21) Appl. No.: 17/034,093

(22) Filed: Sep. 28, 2020

(65) Prior Publication Data
US 2021/0094469 A1 Apr. 1, 2021

(30) Foreign Application Priority Data
Sep. 30, 2019 (JP) .................. 2019-178453

(51) Int. Cl.
*G06F 3/16* (2006.01)
*B60Q 5/00* (2006.01)

(52) U.S. Cl.
CPC .......... *B60Q 5/008* (2013.01); *G06F 3/165* (2013.01)

(58) Field of Classification Search
CPC ............ B60Q 5/006; B60Q 5/008
See application file for complete search history.

(56) References Cited

U.S. PATENT DOCUMENTS

| 2012/0130580 A1* | 5/2012 | Omote ........... G10K 15/02 701/22 |
| 2013/0070932 A1 | 3/2013 | Nyu et al. |
| 2014/0375443 A1* | 12/2014 | Aoyagi ........... B60Q 5/008 340/425.5 |
| 2015/0264500 A1* | 9/2015 | Aoyagi ........... G10K 15/00 381/56 |
| 2017/0123754 A1* | 5/2017 | Kwon ........... G10K 15/02 |

FOREIGN PATENT DOCUMENTS

| JP | 2013-63706 A | 4/2013 |
| JP | 2014-058237 A | 4/2014 |
| WO | 2013136504 A1 | 9/2013 |
| WO | 2014061084 A1 | 4/2014 |

OTHER PUBLICATIONS

Notice of Rejection dated Mar. 28, 2023 for Japanese application No. 2019-178453, 6 pgs.
English translation of Notice of Rejection dated Mar. 28, 2023, 11 pgs.

* cited by examiner

*Primary Examiner* — Joseph Saunders, Jr.
(74) *Attorney, Agent, or Firm* — Volentine, Whitt & Francos, PLLC (57) ABSTRACT

A communication controller that receives moving body related information detected by a sensor and transmits a parameter for generating a sound based on this moving body related information, and a sound generating unit that includes a circuit that generates a basic sound signal having a predetermined sound waveform, receives the parameter received by the communication controller, and outputs a sound signal obtained by adjusting the sound waveform of the basic sound signal based on the received parameter.

7 Claims, 9 Drawing Sheets

FIG. 1

| MOVING SPEED VS (km/h) | FREQUENCY RATIO Z | SOUND VOLUME V |
|---|---|---|
| 5 | Z1 | V1 |
| 6 | Z2 | V2 |
| 7 | Z3 | V3 |
| ⋯ | ⋯ | ⋯ |
| 20 | Z16 | V16 |

| MOVING SPEED VS (km/h) | ADDRESS STORING FREQUENCY RATIO Z | ADDRESS STORING SOUND VOLUME V |
|---|---|---|
| 5 | XX00 | YY00 |
| 6 | XX01 | YY01 |
| 7 | XX02 | YY02 |
| ......... | ......... | ......... |
| 20 | XX0F | YY0F |

| ADDRESS | FREQUENCY RATIO Z |
|---|---|
| XX00 | Z1 |
| XX01 | Z2 |
| XX02 | Z3 |
| ......... | ......... |
| XX0F | Z16 |

| ADDRESS | SOUND VOLUME V |
|---|---|
| YY00 | V1 |
| YY01 | V2 |
| YY02 | V3 |
| ......... | ......... |
| YY0F | V16 |

| MOVING SPEED VS (km/h) | FREQUENCY RATIO Z | SOUND VOLUME V |
|---|---|---|
| 5 | Z1 | V1 |
| 6 | Z2 | V2 |
| 7 | Z3 | V3 |
| ⋯⋯⋯ | ⋯⋯⋯ | ⋯⋯⋯ |
| 20 | Z16 | V16 |

FIG. 9

SOUND OUTPUT DEVICE, COMMUNICATION CONTROLLER, AND SOUND GENERATOR THAT PROVIDES APPROACHING NOTIFICATION SOUND WHILE REDUCING MCU LOAD

BACKGROUND

1. Technical Field

The present invention relates to a sound output device that acoustically output an audible sound, a communication controller, and a sound generator.

2. Description of the Related Art

Generally, electric vehicles and electric hybrid vehicles that run using electric motors generate significantly small noises during low-speed running compared with vehicles with engines. Therefore, there have been commercialized electric vehicles or electric hybrid vehicles mounted with a vehicle approaching notification device that outputs a sound (hereinafter referred to as an approaching notification sound) to notify an approach of the vehicle (for example, see JP-A-2014-58237).

This vehicle approaching notification device includes a microcontroller (hereinafter referred to as an MCU) with a built-in memory in which approaching notification sound data obtained by converting the approaching notification sound into PCM data is stored. The MCU firstly receives information (such as a vehicle speed, rain drops, and tire pressures) from various kinds of sensors via a communications network, such as a Controller Area Network (CAN). This MCU reads the approaching notification sound data from the memory based on such information, and generates an approaching notification sound waveform signal that corresponds to this approaching notification sound data. This approaching notification sound waveform signal is acoustically output outside the vehicle via a Low pass filter (LPF), an amplifier, and a speaker.

Thus, in the vehicle approaching notification device disclosed in JP-A-2014-58237, the MCU performs a generation process of the approaching notification sound waveform signal together with a reception control of the CAN communication.

SUMMARY

The approaching notification sound as described above is a sound emitted from a vehicle for nearby pedestrians, and the pedestrians may recognize a type of vehicle and a vehicle manufacturer of the vehicle by associating the approaching notification sound. Accordingly, for some vehicle manufacturers and types of vehicle, an approaching notification sound with a high-quality sound is desired in order to elevate its own brand value.

However, since making the approaching notification sound the high-quality sound increases a load on the MCU, it is necessary to take measures, such as employing an expensive MCU capable of high-speed processing and employing a Digital-Analog Converter (DAC) high in resolution, and therefore, there has been a problem of a substantial increase in price.

Therefore, an objective of the present invention is to provide a sound output device, a communication controller, and a sound generator capable of outputting a relatively high-quality sound while reducing a load on an MCU.

A sound output device according to the present invention includes a communication controller and a sound generating unit. The communication controller receives moving body related information including a moving speed of a moving body. The communication controller transmits a parameter for generating a sound based on the moving body related information. The sound generating unit includes a circuit that obtains a basic sound signal having a predetermined sound waveform. The sound generating unit receives the parameter transmitted by the communication controller. The sound generating unit outputs a sound signal obtained by adjusting the sound waveform of the basic sound signal based on the received parameter.

A communication controller according to the present invention includes an obtaining unit and an output unit. The obtaining unit is coupled to a data communication network. The obtaining unit obtains moving speed information indicating a moving speed of a moving body via the data communication network. The output unit generates a parameter for generating an approaching notification sound that notifies an approach of the moving body based on the moving speed indicated by the moving speed information obtained by the obtaining unit and outputs the parameter.

A sound generator according to the present invention includes a sound synthesis circuit and a control circuit. The sound synthesis circuit obtains a basic sound signal having a predetermined sound waveform. The control circuit receives a parameter for generating a sound generated corresponding to a moving speed of a moving body. The control circuit controls the sound synthesis circuit to perform an adjustment on the basic sound signal based on the parameter. The sound synthesis circuit performs the adjustment on the basic sound signal based on the parameter to generate an approaching notification sound signal notifying an approach of the moving body and outputs the approaching notification sound signal.

The present invention generates a sound that changes by the moving body related information using the communication controller that receives the moving body related information including the moving speed of the moving body and the sound generating unit including the sound synthesis circuit that generates the sound. That is, the communication controller generates the parameter for generating the sound based on the received moving body related information, and transmits it to the sound generating unit. The sound generating unit obtains the basic sound signal having a predetermined sound waveform and adjusts the sound waveform of this basic sound signal based on the parameter received as described above, thereby generating the sound signal that changes the sound by the moving body related information.

Thus, the present invention uses the sound synthesis circuit that is configured to generate a relatively high-quality sound to generate the sound signal that changes the sound corresponding to the moving body related information. Accordingly, compared to a case where software processing of the communication controller that receives the moving body related information generates the sound signal as described above, it is possible to provide a relatively high-quality sound signal while reducing the load on this communication controller (MCU).

DETAILED DESCRIPTION

The following describes examples of the present invention in detail with reference to the drawings.

Figure 1:
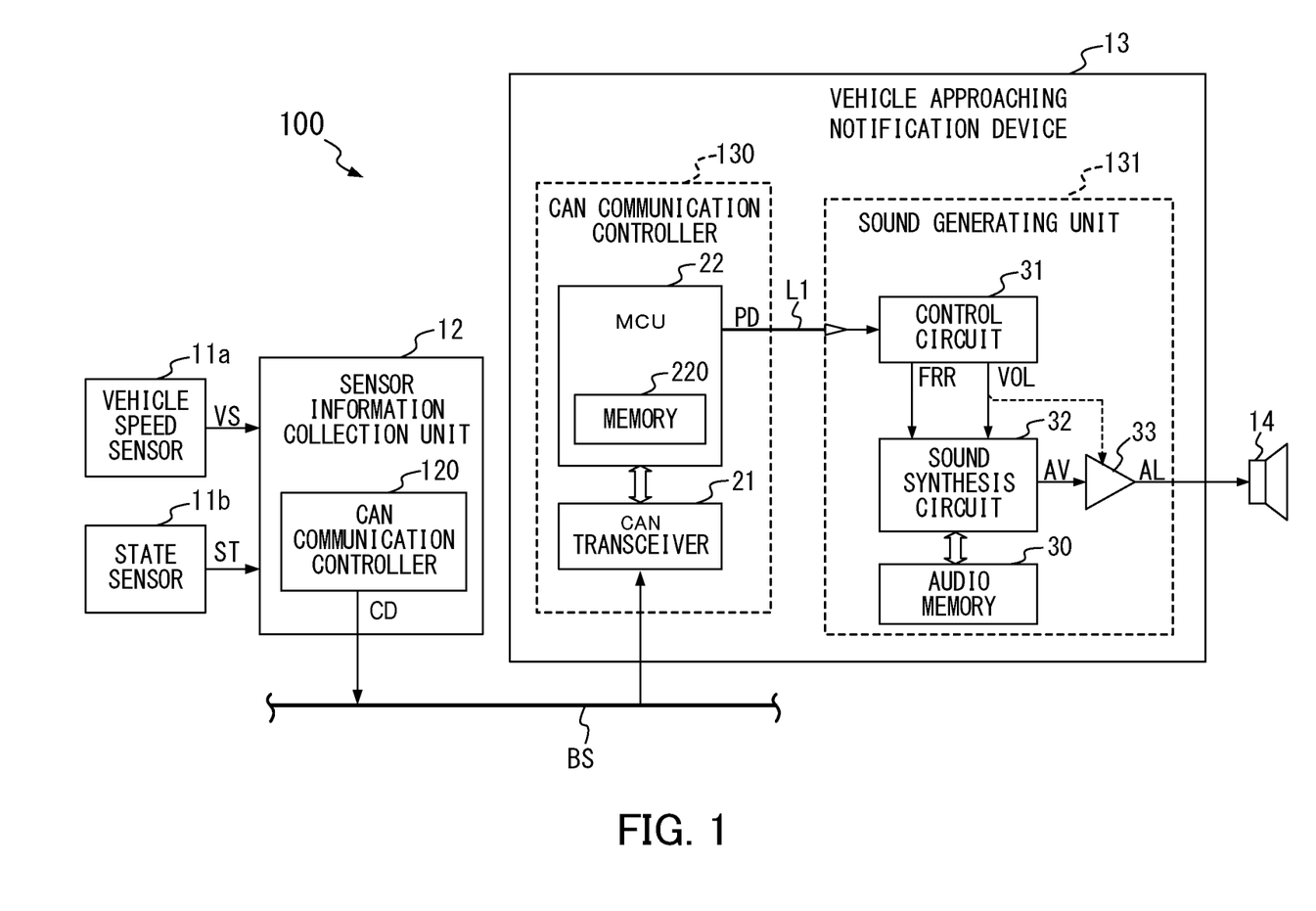
FIG. 1 is a block diagram illustrating a vehicle approaching notification system including a sound output device according to the present invention.

FIG. 1 is a block diagram illustrating a vehicle approaching notification system 100 including a vehicle approaching notification device 13 as a sound output device according to the present invention that outputs a sound (hereinafter referred to as an approaching notification sound) to notify pedestrians and the like of an approach of a vehicle from a vehicle side. The vehicle approaching notification system 100 illustrated in FIG. 1 is to acoustically output an approaching notification sound having a pitch and a sound volume corresponding to a moving speed of the vehicle when the vehicle is running at a speed within a predetermined speed range (such as 5 to 20 km/h).

The vehicle approaching notification system 100 includes a vehicle speed sensor 11a, a state sensor 11b, a sensor information collection unit 12, and a speaker 14, together with the vehicle approaching notification device 13.

The vehicle speed sensor 11a detects the moving speed of the vehicle including this vehicle approaching notification system 100, and supplies a moving speed VS indicating the moving speed to the sensor information collection unit 12. The state sensor 11b detects a state of this vehicle (for example, an acceleration status and tire pressures), a state of an environment near the vehicle (for example, an amount of rain drops received by the vehicle and loudness of an ambient sound), and the like so as to supply state information ST that individually indicates each of the states to the sensor information collection unit 12.

The sensor information collection unit 12 includes a Controller Area Network (CAN) communication controller 120. The sensor information collection unit 12 retrieves the moving speed VS and the state information ST at every predetermined period. The CAN communication controller 120 transmits sensor data CD including the retrieved moving speed VS and state information ST to the vehicle approaching notification device 13 in a format compliant to the CAN communication standard via a CAN bus line BS as a data communication network.

The vehicle approaching notification device 13 includes a CAN communication controller 130 and a sound generating unit 131. The CAN communication controller 130 and the sound generating unit 131 are formed in, for example, two respective semiconductor IC chips. That is, the CAN communication controller 130 is formed in a first semiconductor IC chip, and the sound generating unit 131 as a sound generator is formed in a second semiconductor IC chip different from the first semiconductor IC chip. These first and second semiconductor IC chips are electrically coupled via a wiring L1.

The CAN communication controller 130 includes a CAN transceiver 21 and an MCU 22 as a microcomputer.

The CAN transceiver 21 is coupled to the CAN bus line BS, receives sensor data CD from this CAN bus line BS, and supplies this sensor data CD to the MCU 22.

The MCU 22 controls the CAN transceiver 21 to receive the sensor data CD from the CAN bus line BS.

Furthermore, the MCU 22 generates, for example, the following frequency ratio and sound volume as parameters for generating the approaching notification sound in the sound generating unit 131 based on the received sensor data CD. That is, the MCU 22 obtains a frequency ratio which is a ratio of a frequency of the approaching notification sound to be generated to a frequency of a basic approaching notification sound as a source of the approaching notification sound, and a sound volume when the approaching notification sound is acoustically output, based on the moving speed VS included in the sensor data CD.

In order to obtain these frequency ratio and sound volume, the MCU 22 includes a memory 220 that stores a look-up table associated with frequency ratios and sound volumes for a plurality of respective speeds in the above-described speed range (such as 5 to 20 km/h).

Figure 2:
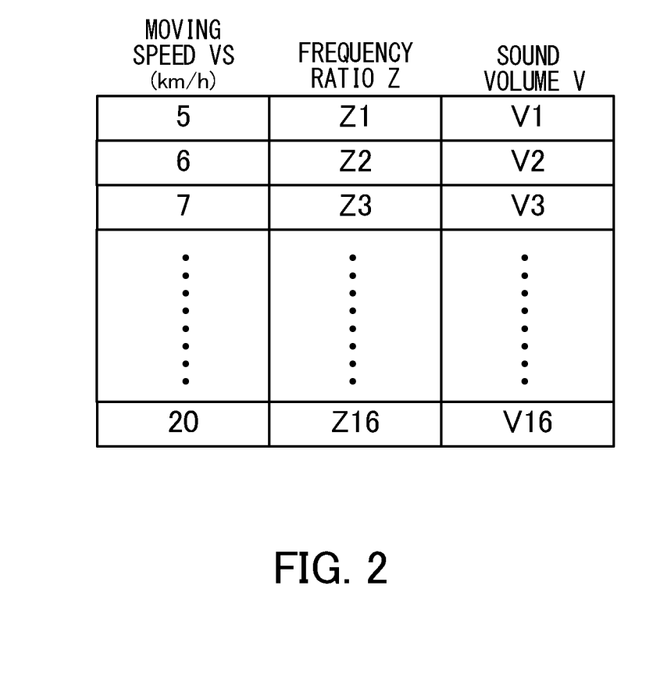
FIG. 2 is a drawing illustrating an exemplary look-up table stored in a memory 220.

FIG. 2 is a drawing illustrating an example of this look-up table.

In the look-up table illustrated in FIG. 2, a pair of frequency ratio Z and sound volume V is associated with each speed obtained by dividing the range of the moving speed of 5 to 20 km/h, which includes the minimum speed of 5 km/h and the maximum speed of 20 km/h, into 16 stages by each speed per hour of 1 km/h. In a case where a change rate of a frequency when the speed changes for 1 km/h is, for example, 0.8%, the frequency ratio Z is indicated by:

$$Z=(1+0.8/100)^X$$

X: speed change amount (km/h) from the minimum speed

The following describes a generation process of a parameter executed by the MCU 22 in response to the reception of the sensor data CD.

Figure 3:
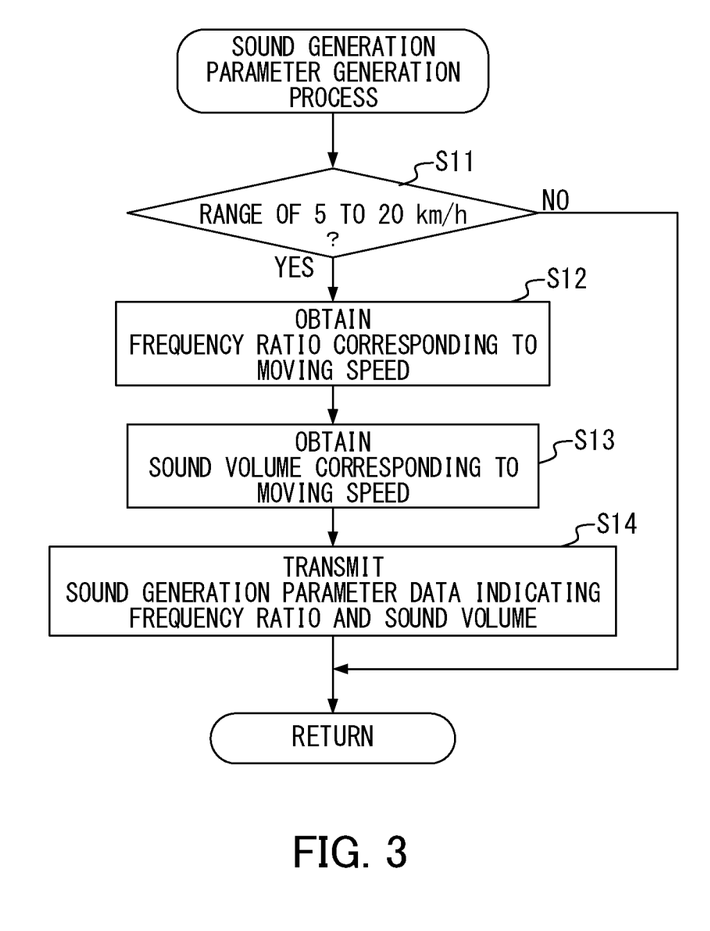
FIG. 3 is a flowchart illustrating an exemplary parameter generation process executed by an MCU 22.

FIG. 3 is a flowchart indicating an exemplary procedure of this parameter generation process.

In FIG. 3, first, the MCU 22 determines whether the moving speed VS included in the sensor data CD indicates a moving speed within the speed range of 5 to 20 km/h or not (Step S11).

At Step S11, when it is determined that the moving speed VS indicates a speed within the speed range of 5 to 20 km/h, the MCU 22 obtains the frequency ratio Z corresponding to the moving speed VS from the look-up table illustrated in FIG. 2 (Step S12).

Next, the MCU 22 obtains the sound volume V corresponding to the moving speed VS from the look-up table illustrated in FIG. 2 (Step S13).

Next, the MCU 22 uses the obtained frequency ratio Z and sound volume V as the parameters, and transmits a parameter signal PD that indicates the parameters in, for example, a bit string in a serial form to the sound generating unit 131 via the wiring L1 (Step S14).

When Step S14 is terminated or it is determined that the moving speed VS does not indicate a speed in the speed range of 5 to 20 km/h at Step S11 described above, the MCU 22 terminates the parameter generation process illustrated in FIG. 3 and goes into a standby state for receiving the sensor data CD.

Thus, the CAN communication controller 130 is coupled to the CAN bus line BS as the data communication network, and includes obtaining units (21, 22) that obtain the moving speed VS indicating the moving speed of the vehicle via the CAN bus line BS and output units (22, 220, S11 to S14) that generate the parameter for generating the approaching notification sound that notifies an approach of the vehicle based on the obtained moving speed VS and output (PD) the parameter to the sound generating unit 131.

The sound generating unit 131 includes an audio memory 30, a control circuit 31, a sound synthesis circuit 32, and an amplifier 33 described below.

The audio memory 30 stores basic approaching notification sound data obtained by converting the basic approaching notification sound, which is a source of the approaching notification sound that is output by the vehicle approaching notification system 100, into PCM data.

When receiving the parameter signal PD, the control circuit 31 extracts each of the frequency ratio Z and the sound volume V from within this received parameter signal PD. The control circuit 31 supplies a frequency ratio signal FRR indicating the frequency ratio Z and a sound volume signal VOL indicating the sound volume V to the sound synthesis circuit 32 in a hardware configuration.

When receiving the frequency ratio signal FRR, the sound synthesis circuit 32 first reads out the above-described basic approaching notification sound data from the audio memory 30, and retrieves the approaching notification sound data. Next, the sound synthesis circuit 32 generates an approaching notification sound signal having a sound waveform whose pitch is multiplied by n times (n is a value of the frequency ratio indicated by the frequency ratio signal FRR) of a pitch of a sound waveform indicated by the retrieved basic approaching notification sound data. The sound synthesis circuit 32 supplies a signal obtained by adjusting an amplitude of the approaching notification sound signal to an amplitude with a magnitude corresponding to a sound volume indicated by the sound volume signal VOL, to the amplifier 33 as an approaching notification sound signal AV.

The amplifier 33 supplies a signal obtained by power-amplifying the approaching notification sound signal AV to the speaker 14 as an approaching notification sound signal AL.

The speaker 14 is installed, for example, in a front bumper of the vehicle, and acoustically outputs an audible sound based on the approaching notification sound signal AL to a space outside the vehicle as the approaching notification sound.

As described above, in the vehicle approaching notification device 13 illustrated in FIG. 1, first, the CAN communication controller 130 receives the moving speed VS transmitted from the sensor information collection unit 12 by the CAN communication. The MCU 22 of the CAN communication controller 130 obtains the sound volume and the frequency ratio to the basic approaching notification sound which is an original of the approaching notification sound from the received moving speed VS. This MCU 22 transmits these frequency ratio and sound volume to the sound generating unit 131 as the parameters for generating the approaching notification sound.

Upon receiving the frequency ratio and the sound volume as the parameters, the sound synthesis circuit 32 of the sound generating unit 131 adjusts the pitch of the basic approaching notification sound to be a pitch multiplied by a value of the received frequency ratio, and furthermore, adjusts the amplitude of this adjusted signal to be an amplitude with the magnitude corresponding to the received sound volume.

This causes the sound synthesis circuit 32 to generate the approaching notification signal having the pitch and the sound volume corresponding to the moving speed of the vehicle and output it.

Thus, in the configuration illustrated in FIG. 1, the MCU 22 of the CAN communication controller 130 does not perform the generation process of the approaching notification sound signal, thereby ensuring a reduced load on this MCU 22.

Since the generation of the approaching notification sound is performed in the sound synthesis circuit 32 of the hardware configuration, a relatively high-quality sound is generated.

The CAN communication controller 130 does not directly transmit the moving speed VS that determines the pitch and the sound volume of the approaching notification sound to the sound generating unit 131, but transmit the frequency ratio Z and the sound volume V corresponding to this moving speed VS to the sound generating unit 131 as the parameters. Accordingly, the sound generating unit 131 can directly control the sound synthesis circuit 32 by the frequency ratio Z and the sound volume V received by the control circuit 31A. This eliminates the need for the control circuit 31A to perform the process to obtain the frequency ratio Z and the sound volume V from the moving speed VS using the look-up table as illustrated in FIG. 2, thereby ensuring a configuration simplified by that amount.

Accordingly, with the configuration illustrated in FIG. 1, a relatively high-quality sound can be provided while reducing the load on the MCU 22 of the CAN communication controller 130.

In the above-described example, the CAN communication controller 130 transmits the frequency ratio Z and the sound volume V corresponding to the moving speed VS to the sound generating unit 131 as the parameters for generating the approaching notification sound.

However, the CAN communication controller 130 may transmit related information that can identify these frequency ratio Z and sound volume V, instead of the frequency ratio Z and the sound volume V, to the sound generating unit 131 as the parameters for generating the approaching notification sound.

Figure 4:
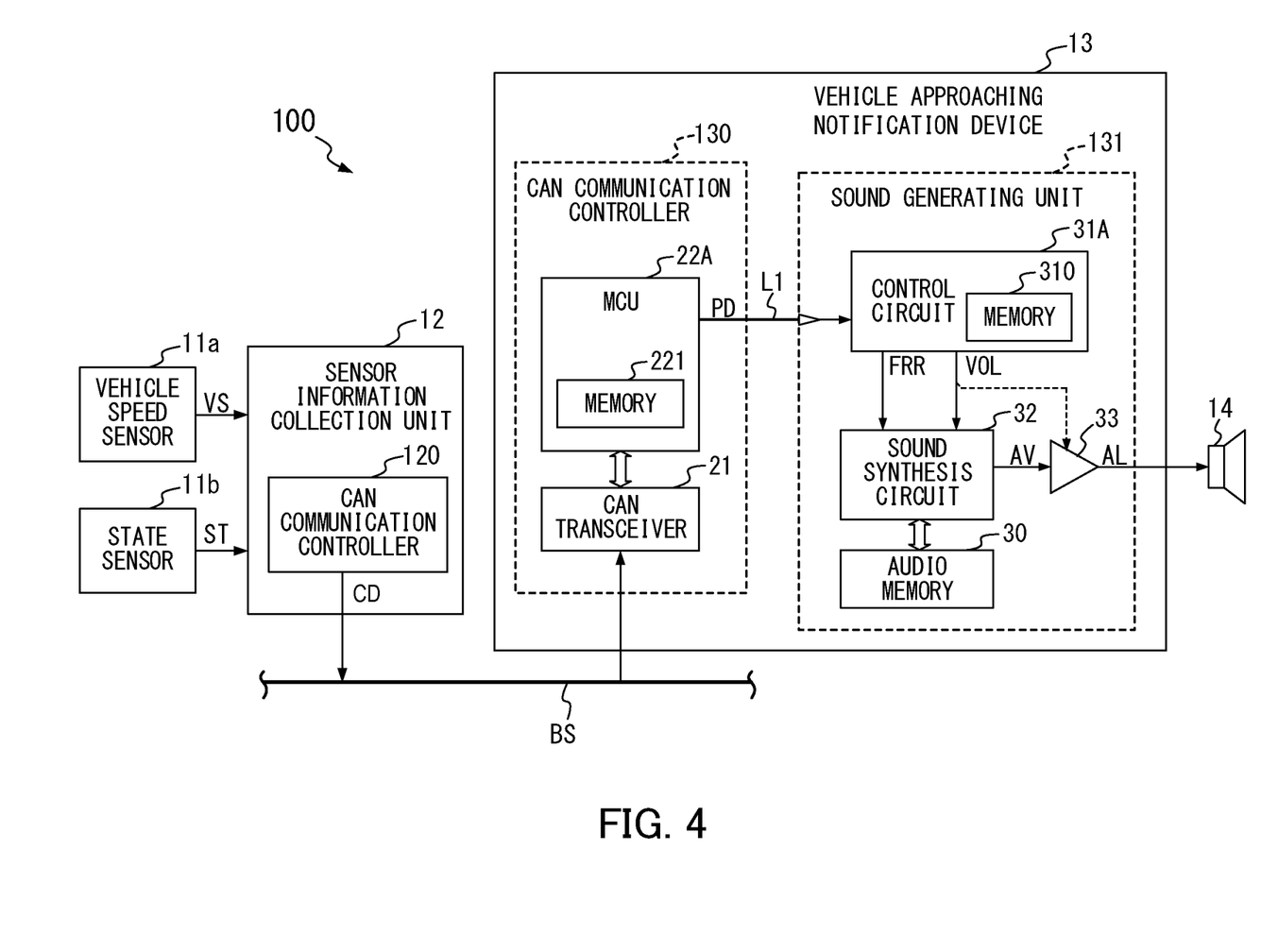
FIG. 4 is a block diagram illustrating another configuration of a vehicle approaching notification device 13.

FIG. 4 is a block diagram illustrating another configuration of the vehicle approaching notification device 13 made in consideration of such an aspect. The configuration illustrated in FIG. 4 has the same configuration as the configuration illustrated in FIG. 1 except that an MCU 22A is employed instead of the MCU 22, and a control circuit 31A is employed instead of the control circuit 31. The following describes operations of the configuration illustrated in FIG. 4 focusing on operations of the MCU 22A and the control circuit 31A.

The MCU 22A controls the CAN transceiver 21 to receive the sensor data CD from the CAN bus line BS similarly to the MCU 22.

The MCU 22A includes a memory 221 that stores the look-up table. The MCU 22A obtains addresses using this look-up table. The addresses are where the frequency ratios and the sound volumes corresponding to the moving speeds VS included in the received sensor data CD are stored.

Figure 5:
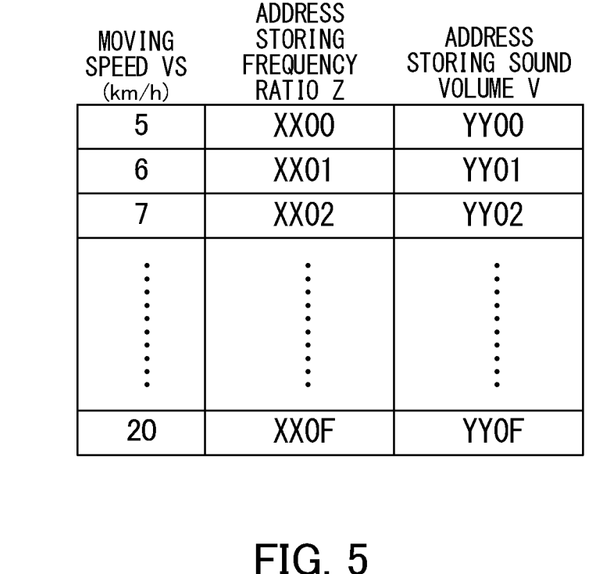
FIG. 5 is a drawing illustrating an exemplary look-up table stored in a memory 221.

FIG. 5 is a drawing illustrating one example of such a look-up table.

In the example illustrated in FIG. 5, an address where a frequency ratio associated with a moving speed is stored and an address where a sound volume associated with the moving speed is stored, are illustrated, which are individually associated with each moving speed obtained by dividing the range of 5 to 20 km/h into 16 stages for each speed per hour of 1 km/h described above.

Figure 6:
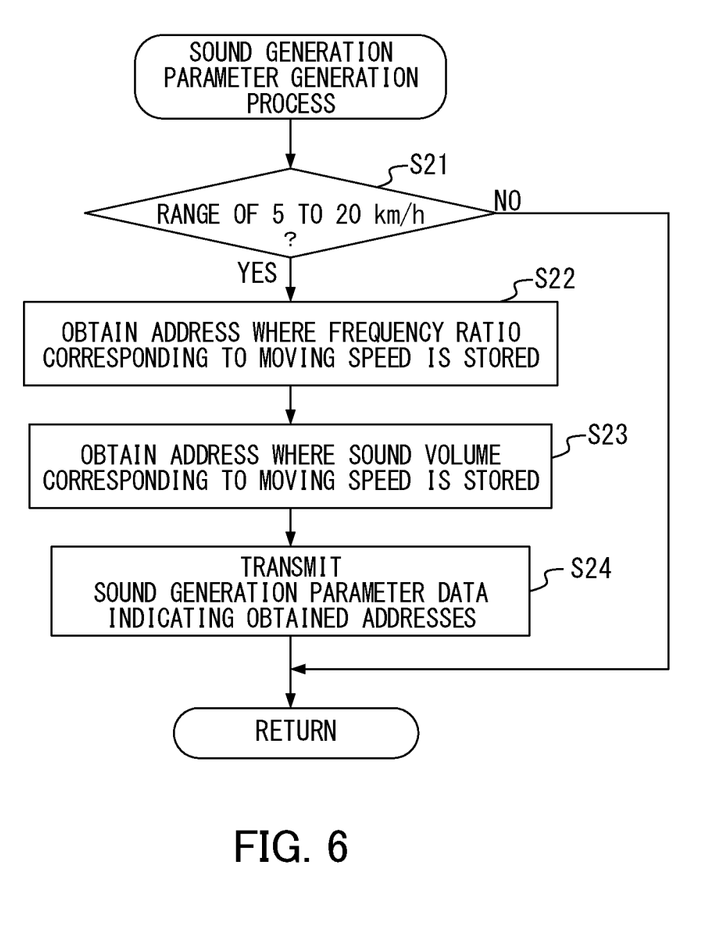
FIG. 6 is a flowchart illustrating an exemplary parameter generation process executed by an MCU 22A.

FIG. 6 is a flowchart showing a procedure of the parameter generation process executed by the MCU 22A.

In FIG. 6, the MCU 22A first determines whether the moving speed VS included in the sensor data CD indicates a speed within the speed range of 5 to 20 km/h or not (Step S21).

At Step S21, when it is determined to indicate the moving speed within this speed range, the MCU 22A obtains an address where the frequency ratio corresponding to the moving speed VS is stored as a first address from the look-up table illustrated in FIG. 5 (Step S22).

Next, the MCU 22A obtains an address where the sound volume corresponding to the moving speed VS is stored as a second address from the look-up table illustrated in FIG. 5 (Step S23).

Next, the MCU 22A uses the obtained first and second addresses respectively storing the frequency ratio and the sound volume as the parameters for generating sound, and transmits a parameter signal PD that indicates the parameters in, for example, a bit string in a serial form to the sound generating unit 131 via the wiring L1 (Step S24).

When Step S24 is terminated or it is determined that the moving speed does not indicate a speed in the speed range of 5 to 20 km/h at Step S21 described above, the MCU 22A terminates the parameter generation process illustrated in FIG. 6 and goes into a standby state for receiving the sensor data CD.

The control circuit 31A included in the sound generating unit 131 includes the memory 310 that stores the frequency ratio and the sound volume.

Figure 7:
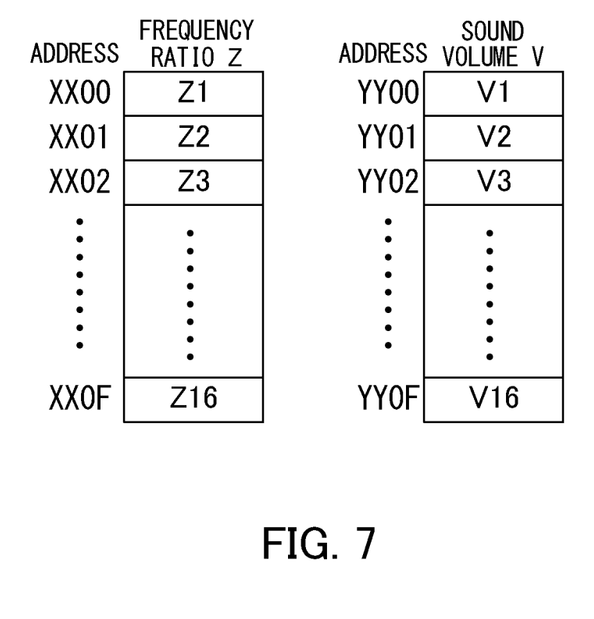
FIG. 7 is a drawing illustrating an exemplary memory content of a memory 310.

FIG. 7 is a drawing illustrating an exemplary memory format of the frequency ratio and the sound volume in the memory 310.

As illustrated in FIG. 7, in the memory 310, addresses [XX00] to [XX0F] corresponding to respective frequency ratios Z1 to Z16 illustrated in FIG. 5 directly become their own addresses [XX00] to [XX0F]. Furthermore, addresses [YY00] to [YY0F] corresponding to respective sound volumes V1 to V16 illustrated in FIG. 5 directly become addresses [YY00] to [YY0F] of the memory 310.

As illustrated in FIG. 7, the addresses [XX00] to [XX0F] of the memory 310 store the frequency ratios Z1 to Z16 corresponding to the respective speeds in increments of 1 km/h within the speed range of 5 to 20 km/h, similarly to the look-up table illustrated in FIG. 2. Furthermore, the addresses [YY00] to [YY0F] of the memory 310 store the sound volumes V1 to V16 corresponding to the respective speeds in increments of 1 km/h within the speed range of 5 to 20 km/h, similarly to the look-up table illustrated in FIG. 2.

When receiving the parameter signal PD transmitted by the MCU 22A, the control circuit 31A extracts the first address where the frequency ratio is stored and the second address where the sound volume is stored from within this received parameter signal PD.

The control circuit 31A reads out one frequency ratio Z corresponding to the first address and one sound volume V corresponding to the second address extracted as described above among the frequency ratios Z1 to Z16 and the sound volumes V1 to V16 stored in the memory 310 as illustrated in FIG. 7.

The control circuit 31A supplies each of the frequency ratio signal FRR indicating the frequency ratio Z and the sound volume signal VOL indicating the sound volume V to the sound synthesis circuit 32. The operations of the sound synthesis circuit 32, the amplifier 33, and the audio memory 30 are the same as the configuration illustrated in FIG. 1 as described above, and therefore its description is omitted.

Thus, in the configuration illustrated in FIG. 4, the sound generating unit 131 includes the memory 310 in which the respective addresses illustrated in FIG. 5 the frequency ratios Z1 to Z16 and the sound volumes V1 to V16 corresponding to the respective moving speeds obtained by dividing the speed range of 5 to 20 km/h by each 1 km/h are stored. The MCU 22A of the CAN communication controller 130 obtains the addresses of the memory 310, in which these frequency ratio Z and sound volume V are stored, from the look-up table illustrated in FIG. 5, instead of the frequency ratio Z and the sound volume V corresponding to the moving speed VS. The MCU 22A then transmits the obtained address to the sound generating unit 131 as the parameters for generating the sound.

Accordingly, with the configuration illustrated in FIG. 4, the MCU 22A of the CAN communication controller 130 does not perform a process to obtain the frequency ratio and the sound volume from the moving speed VS, and therefore, the load on this MCU 22A can be further reduced.

In the configuration illustrated in FIG. 4, the CAN communication controller 130 transmits the respective addresses of the frequency ratio Z and the sound volume V corresponding to the moving speed VS as the parameters for generating the sound to the sound generating unit 131. However, the CAN communication controller 130 may transmit one obtained by performing a process with a reduced changing rate of the speed in association with an elapsed time on the moving speed VS detected by the vehicle speed sensor 11a to the sound generating unit 131 as the parameters for generating the sound.

Figure 8:
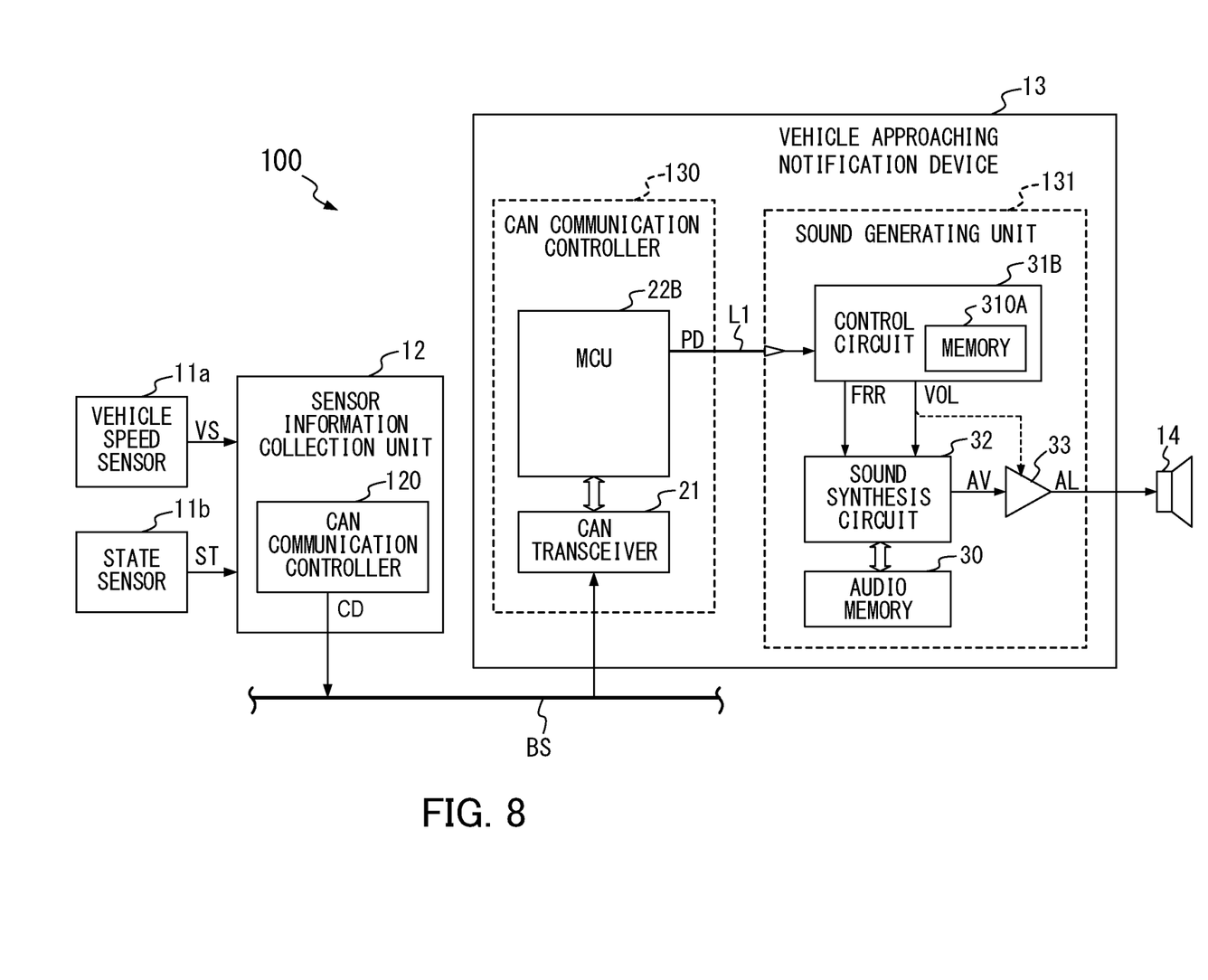
FIG. 8 is a block diagram illustrating a modification of the vehicle approaching notification device 13 illustrated in FIG. 4.

FIG. 8 is a block diagram illustrating a modification of the vehicle approaching notification device 13 illustrated in FIG. 4 made in consideration of such an aspect. The configuration illustrated in FIG. 8 has the same configuration as the configuration illustrated in FIG. 4, except that an MCU 22B is employed instead of the MCU 22A, and a control circuit 31B is employed instead of the control circuit 31A. Accordingly, the following describes operations of the configuration illustrated in FIG. 8 focusing on the operations of the MCU 22B and the control circuit 31B.

The MCU 22B controls the CAN transceiver 21 to receive the sensor data CD from the CAN bus line BS, similarly to the MCU 22A.

Furthermore, the MCU 22B, for example, calculates an average of the moving speeds as a smoothing process that makes the change of the moving speed VS included in this sensor data CD gradual. That is, the MCU 22B, for example, at every predetermined period, obtains an average of the moving speeds VS (referred to as an average moving speed) obtained within the predetermined period, and uses it as a parameter for generating the sound. The MCU 22B transmits a parameter signal PD that indicates this parameter in a bit string in a serial form to the sound generating unit 131 via the wiring L1.

The control circuit 31B included in the sound generating unit 131 includes a memory 310A in which a look-up table described below is stored.

Figure 9:
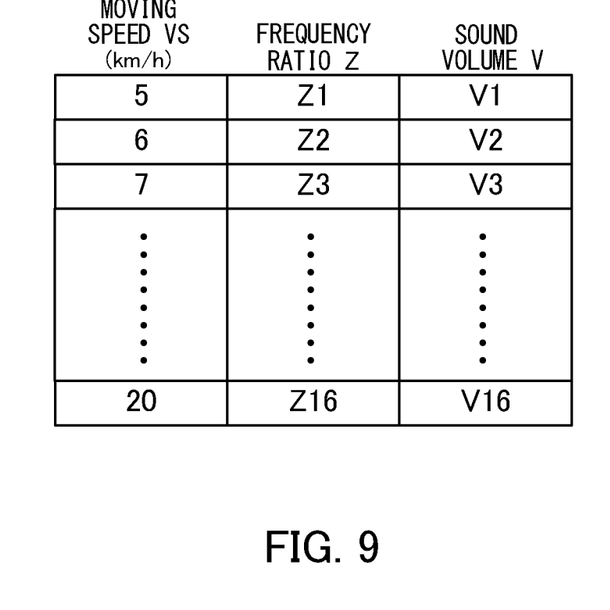
FIG. 9 is a drawing illustrating an exemplary look-up table stored in a memory 310A.

FIG. 9 is a drawing illustrating an exemplary look-up table stored in the memory 310A.

As illustrated in FIG. 9, this look-up table shows the respective moving speeds in increments of 1 km/h within the speed range of 5 to 20 km/h associated with the frequency ratios Z1 to Z16 and the sound volumes V1 to VS16, similarly to the look-up table stored in the memory 220 illustrated in FIG. 1.

The control circuit 31B of the sound generating unit 131 extracts the average moving speed from within this received parameter signal PD upon receiving the parameter signal PD transmitted by the MCU 22B.

The control circuit 31B obtains the frequency ratio and the sound volume corresponding to the average moving speed from the look-up table stored in the memory 310A as illustrated FIG. 9. That is, the control circuit 31B reads out the frequency ratio Z and the sound volume V corresponding to the moving speed illustrated at the average moving speed included in the parameter signal PD from the memory 310A.

The control circuit 31A supplies each of the frequency ratio signal FRR indicating the frequency ratio Z and the sound volume signal VOL indicating the sound volume V to the sound synthesis circuit 32. The operations of the sound synthesis circuit 32, the amplifier 33, and the audio memory 30 are the same as those illustrated in FIG. 1 described before, and its description is omitted.

Thus, in the configuration illustrated in FIG. 8, the sound generating unit 131 includes the memory 310A in which the frequency ratios Z1 to Z16 and the sound volumes V1 to V16 associated with the respective moving speeds obtained by dividing the speed range 5 to 20 km/h by each 1 km/h. The MCU 22B of the CAN communication controller 130, for example, transmits the average moving speed obtained by averaging the moving speed VS to the sound generating unit 131 as a parameter for generating the sound, as the smoothing process to make the change with respect to the moving speed VS gradual.

In the configuration illustrated in FIG. 8, the process to obtain the frequency ratio and the sound volume from the moving speed VS using the look-up table illustrated in FIG. 9 is necessary for the control circuit 31B in the sound generating unit 131. However, it is possible to reduce the load on the MCU 22B of the CAN communication controller 130 by that amount.

While in the above-described embodiments, the look-up tables as illustrated in FIG. 2, FIG. 5, FIG. 7, and FIG. 9 are used to generate the frequency ratio and the sound volume corresponding to the moving speed VS, the frequency ratio and the sound volume may be obtained from the moving speed VS using predetermined functions without using it. That is, for example, the MCU 22 or the control circuit 31B calculates the frequency ratio corresponding to this moving speed VS using the function (for example, the above-described formula) having the moving speed VS as a variable, as well as calculating the sound volume corresponding to this moving speed VS using the function having the moving speed VS as a variable.

In the above-described examples, the MCU 22, 22A, or 22B in the CAN communication controller 130 generates the parameter (for example, the frequency ratio Z and the sound volume V) for generating the approaching notification sound based on the moving speed VS detected by the vehicle speed sensor 11a.

However, the MCU may obtain the parameter by considering not only this moving speed VS, but also various kinds of state information (such as, an acceleration rate of the vehicle, tire pressures, an amount of rain drops received by the vehicle, and loudness of an environmental sound) detected by the state sensor 11b.

In the above-described examples, the basic approaching notification sound which is the original of the approaching notification sound is converted into PCM data and stored in the audio memory 30. The sound synthesis circuit 32 generates the approaching notification sound signal AV by adjusting the waveform of the basic approaching notification sound converted into PCM data based on the parameter.

However, the method for generating the approaching notification sound is not limited to such a method. For example, the sound synthesis circuit 32 may generate the approaching notification sound signal AV by generating a single sine wave with a predetermined cycle as the basic approaching notification sound and performing the above-described adjustment (the pitch and the sound volume) on the basic approaching notification sound. Alternatively, the approaching notification sound signal AV may be generated by: generating a plurality of sine waves having mutually different frequencies and amplitudes, generating the basic approaching notification sound by synthesizing each of them at a desired ratio, and performing the above-described adjustment (the pitch and the sound volume) on the basic approaching notification sound. Employing such a method for generating the approaching notification sound eliminate the need for the audio memory 30.

While in the above-described examples, the sound synthesis circuit 32 adjusts the sound volume of the approaching notification sound corresponding to the sound volume signal VOL, the sound volume adjustment of the approaching notification sound may be performed by the amplifier 33 based on the sound volume signal VOL.

While in the above-described examples, the CAN communication controller 130 and the sound generating unit 131 are formed in the respective separated semiconductor IC chips, the CAN communication controller 130 and the sound generating unit 131 may be formed together in a single semiconductor IC chip.

While the vehicle approaching notification system 100 illustrated in the above-described examples is premised on being included in a vehicle, it may be included in, for example, a flying object including a drone, a balloon, an aircraft, and the like, or a moving body, such as a ship, a train, or an animal containing a human, and the like, other than a vehicle. The moving speed of this moving body is also not limited to be detected by a sensor. That is, it is only necessary for the CAN communication controller 130 to receive at least moving body related information including the moving speed of such a moving body.

That is, it is only necessary that a sound output device, one of examples is the vehicle approaching notification device 13, includes the following communication controller and sound generating unit that outputs a sound signal, a sound of which (for example, the approaching notification sound) changes corresponding to the moving body related information including the received moving speed of the moving body.

The communication controller (130) receives the moving body related information (VS) including the moving speed (VS) of the moving body, and transmits a parameter (the frequency ratio, the sound volume, the address, the average moving speed, and the like) for generating the sound based on this moving body related information. The sound generating unit (131) includes the circuit (32) that generates the basic sound signal having the predetermined sound waveform, receives the parameter transmitted from the communication controller (130), and outputs the sound signal (AV, AL) obtained by adjusting the sound waveform of the basic sound signal based on the received parameter.

With such a configuration, the sound synthesis circuit exclusive for generating the sound is responsible for generating the sound signal, and therefore, it is possible to output the relatively high-quality sound signal while reducing the load on the communication controller compared with the case where the sound signal is generated by the software processing by the communication controller.

While in the above-described examples, the moving speed detected by the vehicle speed sensor 11a is used as the information indicating the moving speed of the moving body, such as a vehicle, information with which the moving speed can be estimated may be used, instead of the information indicating the moving speed itself. For example, the information related to the moving speed of the moving body, such as an accelerator position and a brake force, is obtained, and the moving speed estimated based on the information may be used. A plurality of these pieces of information may be combined and the information indicating the moving speed of the vehicle may be generated and used.

While in the above-described examples, the look-up tables as illustrated in FIG. 2, FIG. 5, FIG. 7, and FIG. 9 are used in order to obtain the frequency ratio Z and the sound volume V corresponding to a certain moving speed VS, the frequency ratio and the sound volume corresponding to one moving speed are not limited to one each. The approaching notification sound signal AV may be generated by: setting a plurality of the frequency ratios and a plurality of sound volumes corresponding to one moving speed as the parameters, and adjusting the waveform of the basic approaching notification sound based on this parameter.

What is claimed is:

1. A sound output device comprising:
a communication controller configured to receive moving body related information including a moving speed of a moving body, to transmit parameters for generating a sound based on the moving body related information when the moving speed of the moving body is within a predetermined speed range, and to stop the transmitting of the parameters when the moving speed of the moving body is either lower or higher than the predetermined speed range; and
a sound generating unit including a circuit that obtains a basic sound signal having a predetermined sound waveform, the sound generating unit configured to output, when the parameters transmitted by the communication controller are received, a sound signal obtained by adjusting the predetermined sound waveform of the basic sound signal based on the received parameters.

2. The sound output device according to claim 1, wherein the communication controller generates a frequency ratio and a sound volume of the sound signal as the parameters based on the moving speed indicated by the moving body related information, and
the sound generating unit adjusts a pitch of the basic sound signal in accordance with the frequency ratio of the parameters and adjusts an amplitude of the basic sound signal in accordance with the sound volume of the parameters so as to output an adjusted basic sound signal as the sound signal.

3. The sound output device according to claim 1, wherein the communication controller obtains one address belonging to a first address group and one address belonging to a second address group corresponding to the moving speed indicated by the moving body related information as the parameters from a look-up table, the look-up table showing first to rth addresses belonging to the first address group and first to rth addresses belonging to the second address group each associated with first to rth (r is an integer equal to or more than 2) moving speeds,
wherein the sound generating unit comprises a memory in which first to rth frequency ratios with respect to a frequency of the basic sound signal are respectively stored in the first to rth addresses belonging to the first address group, and first to rth sound volumes are respectively stored in the first to rth addresses belonging to the second address group,
wherein the sound generating unit
reads out from the memory each of a frequency ratio stored in one address belonging to the first address group and a sound volume stored in one address belonging to the second address group as the parameters, and
adjusts a pitch of the basic sound signal in accordance with the frequency ratio read out from the memory and adjusts an amplitude of the basic sound signal in accordance with the sound volume read out from the memory so as to output an adjusted basic sound signal as the sound signal.

4. The sound output device according to claim 1, wherein the communication controller calculates an average of moving speeds indicated by the moving body related information as an average moving speed, and transmits the average moving speed to the sound generating unit as the parameters, and
the sound generating unit
obtains a frequency ratio and a sound volume corresponding to a moving speed indicated by the average moving speed from a look-up table in which first to rth frequency ratios and first to rth sound volumes are respectively associated with first to rth (r is an integer equal to or more than 2) moving speeds, and
adjusts a pitch of the basic sound signal in accordance with the frequency ratio obtained from the look-up table and adjusts an amplitude of the basic sound signal in accordance with the sound volume obtained from the look-up table so as to output an adjusted basic sound signal as the sound signal.

5. The sound output device according to claim 1, wherein the sound generating unit outputs the sound signal as an approaching notification sound that notifies an approach of a moving body.

6. The sound output device according to claim 1, wherein the communication controller is disposed in a first semiconductor chip, and the sound generating unit is disposed in a second semiconductor chip separated from the first semiconductor chip.

7. A communication controller comprising:
an obtaining unit coupled to a data communication network, configured to obtain moving speed information indicating a moving speed of a moving body via the data communication network; and
an output unit configured to generate, when the moving speed of the moving body is within a predetermined speed range, parameters for generating an approaching notification sound that notifies an approach of the moving body based on the moving speed indicated by the moving speed information obtained by the obtaining unit, to output the parameters, and to stop, when the moving speed of the moving body is either lower or higher than the predetermined speed range, the generating and the outputting of the parameters.

* * * * *